June 1, 1948.                J. M. ARCHER ET AL                 2,442,633
                          MEAT BALL FORMING MACHINE
Filed July 9, 1943                                        3 Sheets-Sheet 2
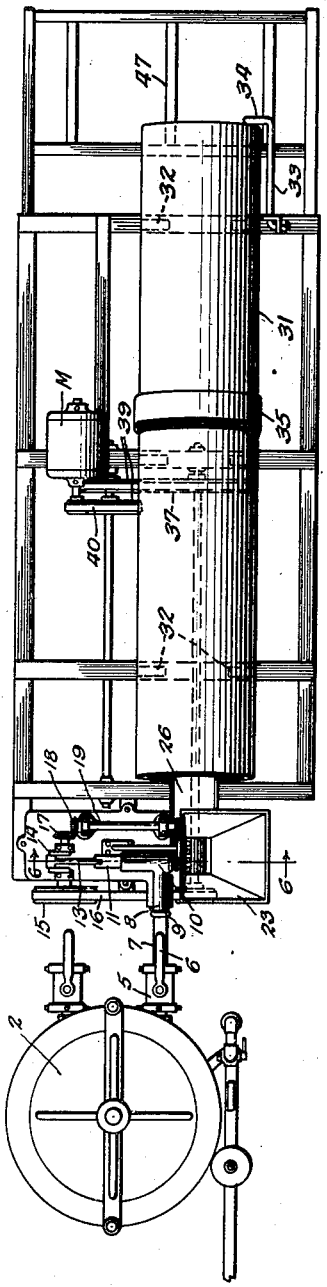
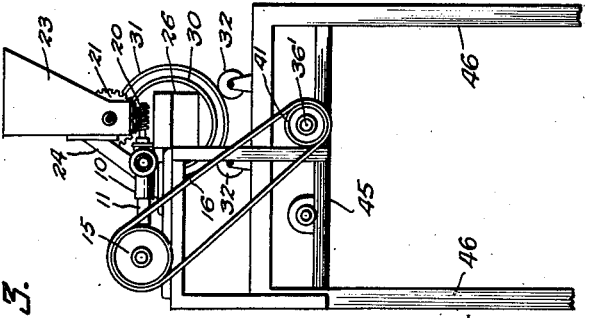
Inventors
J. M. Archer
J. A. Pepper
By Mason Fenwick & Lawrence
Attorneys June 1, 1948. J. M. ARCHER ET AL 2,442,633
MEAT BALL FORMING MACHINE
Filed July 9, 1943 3 Sheets-Sheet 3
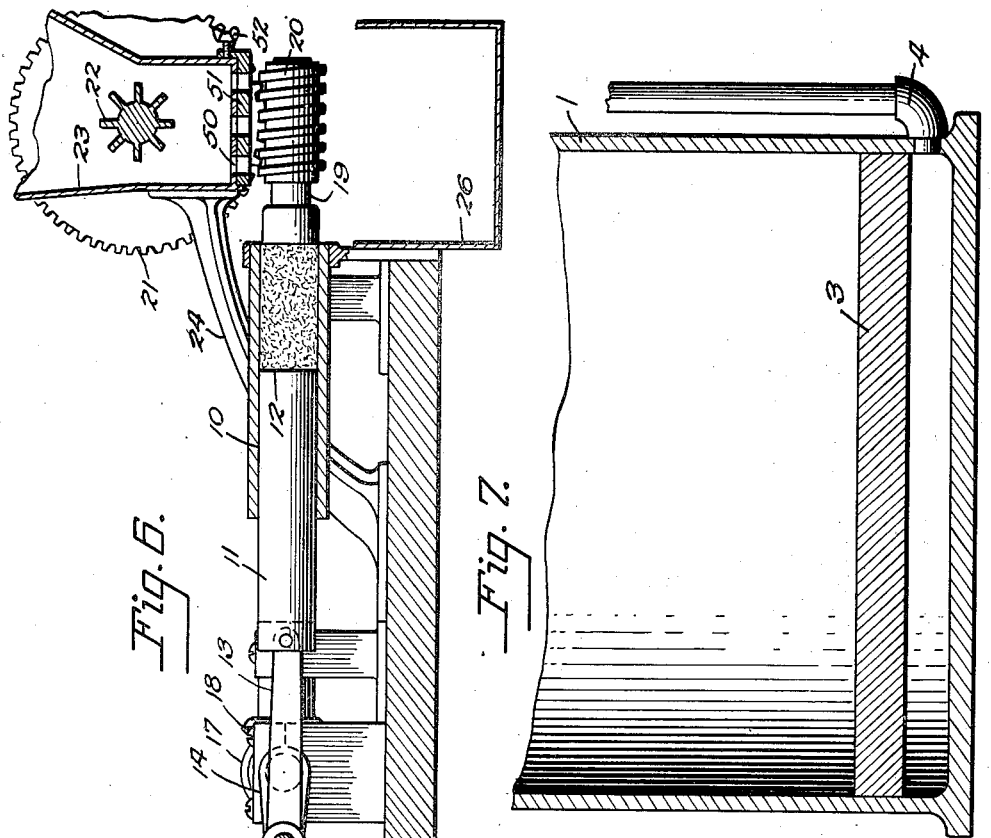
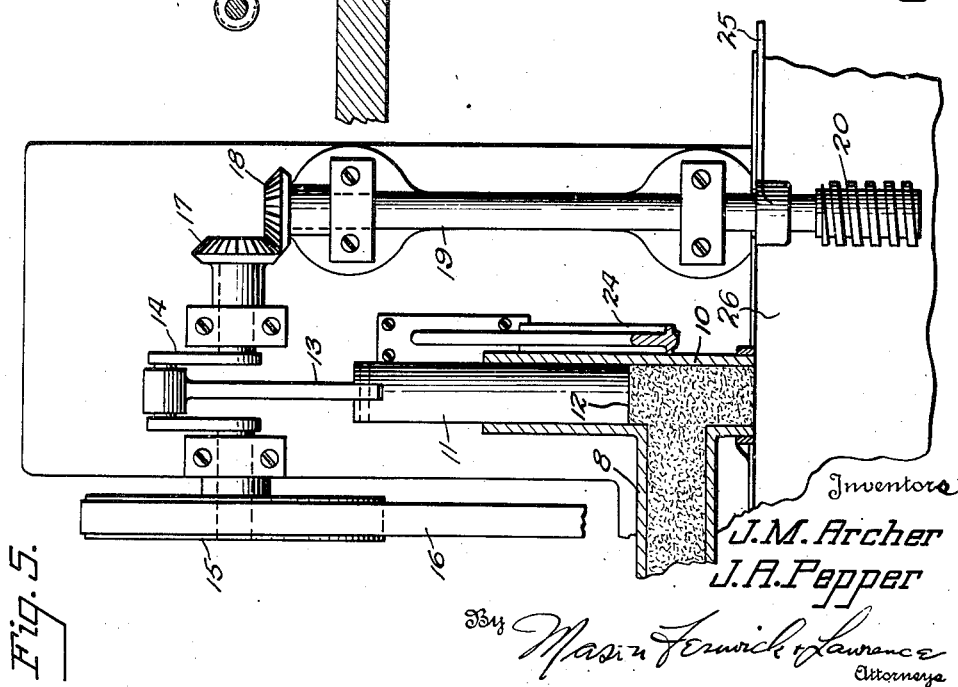

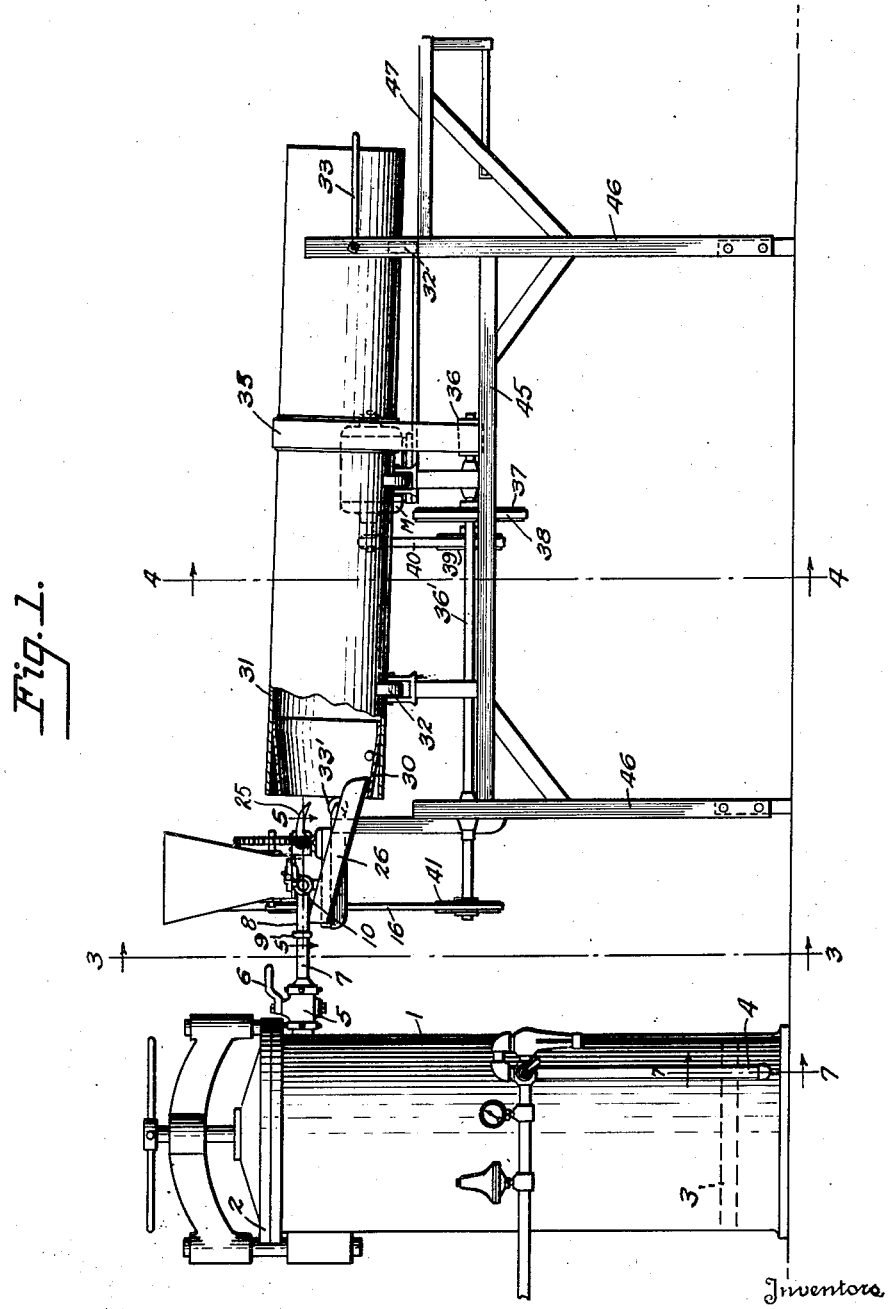

Patented June 1, 1948

2,442,633

UNITED STATES PATENT OFFICE 2,442,633

MEAT BALL FORMING MACHINE

John M. Archer and John A. Pepper, Vineland, N. J.

Application July 9, 1943, Serial No. 494,110

4 Claims. (Cl. 17—32)

1

This invention relates to food forming machinery and more particularly to a device for forming ground meats into balls.

The use of meat balls in connection with canned food products, such as spaghetti and the like, on a large commercial scale, as in canneries, presents the problem of preparing such balls rapidly, economically and uniformly.

It is further desirable, if not essential, that the material be not touched by the operators of the machine and that such parts of the machinery as come in contact with the ground meat be readily removable for the purpose of cleaning and sterilization.

The structural formation of ground or shredded meat, containing as it does, a substantial amount of fibrous material, presents problems in connection with the severing of portions of the ground meat to be formed into balls and the mechanism for accomplishing this severing of the portions constitutes an important part of the invention.

The objects of the invention are to provide a device for the rapid, uniform and sanitary formation of spherical balls from a mass of ground meat.

More particular objects will appear in the course of the following detailed description.

The invention consists in the novel construction, arrangement and combinations of parts hereinafter more particularly described and claimed.

Three sheets of drawings accompany this specification as part thereof in which like reference characters indicate like parts throughout:

Figure 1 is a front elevation of mechanism embodying the present invention;

Figure 2 is a plan view;

Figure 3 is a cross section taken on line 3—3 of Figure 1;

Figure 4 is a cross section taken on line 4—4 of Figure 1;

Figure 5 is a fragmentary cross section taken on line 5—5 of Figure 1;

Figure 6 is a fragmentary cross section taken on line 6—6 of Figure 2;

Figure 7 is a fragmentary cross section taken on line 7—7 of Figure 1.

In the embodiment of the invention herein illustrated 1 indicates a cylindrical container adapted to receive the stock of ground meat which is to be formed into meat balls and which container is provided with a removable lid 2 with suitable devices for handling and securing the same in position and also provided with a piston 3 arranged to be operated by fluid pressure admitted beneath the piston through pipe 4 from some suitable source of pressure not shown. Adjacent the top the container has an outlet controlled by a valve 5 with manual control lever 6 and discharging through a pipe 7. This container mechanism generally is well known in the art and in commercial use for handling food material and more detailed description is not believed necessary. It will be apparent that with the piston 3 in lowered position the container can be filled with ground meat and the cover 2 placed in sealing position over the top and that thereafter the admission of fluid pressure through pipe 4 below piston 3 will raise piston 3 within the container and force the ground meat through the outlet valve 5 in a stream under pressure.

The outlet pipe 7 is connected by means of a quick release connection 9 to the tubular portion 8 which communicates with a cylinder 10 within which is reciprocable a piston 11 having its forward end formed as a planar surface 12. The piston 11 is connected by a connecting rod 13 to a crank 14 driven by a pulley 15 and belt 16 from the general drive mechanism which will be hereinafter more fully described. The opposite end of the crank shaft carries a bevel gear 17 which meshes with another bevel gear 18 carried by shaft 19 which carries adjacent its outer end a rotary knife blade 25 positioned to rotate in a plane closely adjacent that of the forward end of cylinder 10 as is well illustrated in Figure 5. On the outer end of shaft 19 is the worm 20 which meshes with a gear 21 mounted on a spindle carrying paddle wheel 22 adapted to agitate bread crumbs, or the like, in a container 23 supported as by pedestal 24 from the frame of the machine so that its bottom outlets 50 are over and adjacent the forward ends of cylinder 10. The effective size of the outlet openings 50 can be modified by means of a perforated plate 51 slidably mounted below the bottom of container 23 and adjustably secured as by set screw 52.

Below the forward end of the cylinder 10 is positioned an inclined chute 26 into which portions of ground meat delivered from cylinder 10 can drop and gravitate downwardly into the upper forward end of cylindrical drum 31. A funnel-shaped mouth piece 30 is positioned in the forward end of the drum 31 so as to accelerate the speed of the portions entering the drum to avoid congestion at that point. The drum 31 is rotatably supported on a plurality of rollers 32 which are spaced and arranged to constitute a cradle to support the drum 31 with its long axis inclined with respect to the horizontal and from which cradle it can be readily lifted when desired for cleaning and sterilizing. The drum 31 is held in operative position by a hook member 33 having a hook 34 adapted to engage the lower end of the drum and a roller 33' arranged to engage the upper end of the drum. The drum 31 is rotated by a belt 35 which passes around the outer circumference of the drum and also around a conical pulley 36 mounted on a shaft 36' upon which is also mounted a pulley 37 which is connected as by a belt 38 to pulley 39 connected by a belt 40 to a motor M. The shaft 36' also carries on its forward end a pulley 41 connected by a belt 16 with pulley 15 carried by the shaft of crank 14.

All the above mechanism is supported by suitable frame work 45 mounted on legs 46 which frame work includes at the rear end and under the lower end of drum 31 a table 47 upon which trays can be placed to receive the finished meat balls as they gravitate out of the cylinder 31.

In operation the ground meat is forced by fluid pressure from the container 1 through pipe 7 and the tubular flange 8 into cylinder 10 where it is cut off by reciprocating piston 11 into portions which are forced forwardly by the piston and out the forward end of cylinder 10 where they are wiped from the planar forward face 12 of piston 11 by the rotary knife blade 25 which is synchronized in speed with the reciprocation of piston 11 so that it will pass over the forward planar face 12 of the piston at the forward end of each stroke of the piston and during the period when the direction of travel of the piston is being reversed. As the portions of ground meat are being thus wiped from the forward face of piston 11 and dropped into inclined chute 26 bread crumbs or the like are being sifted over the same from container 23 and these bread crumbs both loose and those adhering to the portions of the meat gravitate down the chute 26 and into the upper and forward end of the cylinder 31. At this point it will be noted that these portions of ground meat are in the form of cylinders and are delivered to chute 26 so that they will roll down the chute and thus enter the drum 31, each with its axis perpendicular to the long axis of the drum 31. By reason of this arrangement the rotating drum 31 will engage these cylindrical portions of meat transversely to their axis and thus impart to the particles rotary motion as they gravitate downward through the drum and thus rotate these cylindrical portions into spherical balls, in which form they are discharged at the lower end of the drum 31 ready for packing or use as may be desired.

Various modifications in the structural assembly and arrangement of the parts will readily suggest themselves to those skilled in the art, but all within the scope of the present invention as claimed.

What we claim is:

1. Meat ball forming device comprising means for forming a stream of ground meat under pressure, a horizontally disposed cylinder angularly disposed with respect to the direction of said stream, said stream forming means communicating with the cylinder, a piston reciprocable in the cylinder operating to close communication between the stream and cylinder and to expel the contents of the cylinder as a horizontally disposed cylindrical unit, a rotary knife arranged to free the unit from the piston, an inclined rotating drum and means for directing the expelled cylindrical units to the high end of the drum with their long axis transverse the long axis of the drum.

2. Machine for forming spherical meat balls comprising, in combination, means for forming ground meat into cylindrical portions, an inclined rotary drum and means for feeding said cylindrical portions into the upper end of the rotary drum with their long axis perpendicular to the long axis of the drum.

3. Machine for forming spherical meat balls comprising, in combination, means for forming compressed ground meat into cylindrical portions, an inclined rotary drum and means for gravitationally feeding the cylindrical portions from the forming means into the high end of the rotary drum with their long axis perpendicular to the long axis of the drum.

4. Device of claim 2 with synchronized operating means for the portion forming means and rotary drum whereby the portions are delivered successively to the drum and rotated in said drum to spherical shape.

JOHN M. ARCHER.
JOHN A. PEPPER.

REFERENCES CITED

The following references are of record in the file of this patent:

UNITED STATES PATENTS

| Number | Name | Date |
|---|---|---|
| 1,106,087 | Du Pont | Aug. 4, 1914 |
| 1,106,138 | Du Pont | Aug. 4, 1914 |
| 1,327,806 | Bunde | Jan. 13, 1920 |
| 1,383,105 | Guild | June 28, 1921 |
| 1,397,658 | Rasmussen | Nov. 22, 1921 |
| 1,597,102 | Navone | Aug. 24, 1926 |
| 1,807,295 | Kirchoff | May 26, 1931 |
| 1,970,336 | Pointon et al. | Aug. 14, 1934 |
| 2,076,315 | Albrecht | Apr. 6, 1937 |
| 2,274,606 | Christiansen | Feb. 24, 1942 |
| 2,324,202 | Felton | July 13, 1943 |

FOREIGN PATENTS

| Number | Country | Date |
|---|---|---|
| 369,273 | Great Britain | Mar. 16, 1932 |